July 21, 1931.    C. B. MILLS    1,815,575
INDICATING DEVICE
Original Filed Sept. 14, 1921
Fig.1.
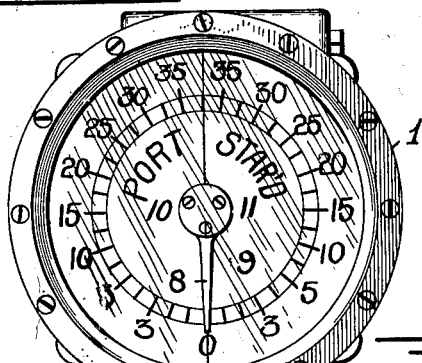
Fig.2.
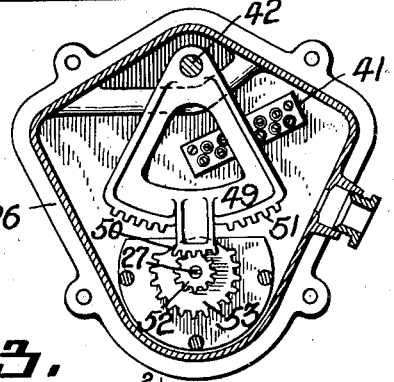
Fig.3.
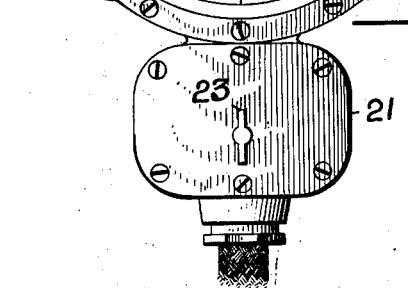
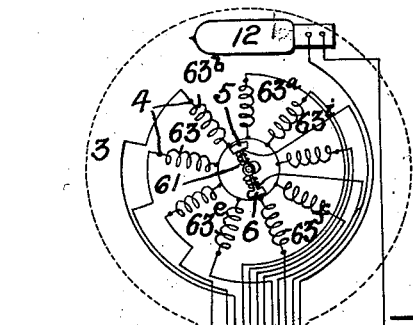
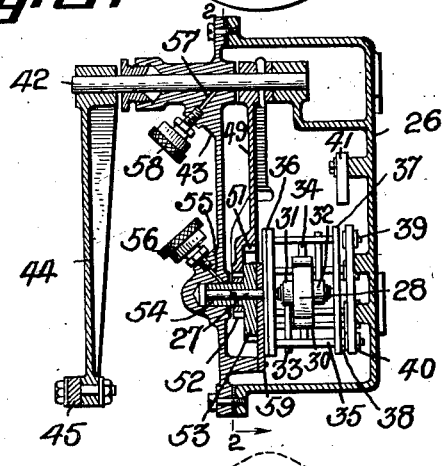
Fig.4.
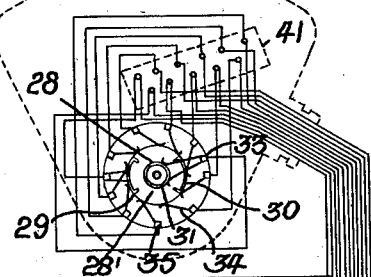
Fig.5.
INVENTOR.
CHESTER B. MILLS DEC'D.
BY LUELLA H. MILLS AND
THE NATIONAL CITY BANK, CO-EXECUTORS,
OF BROOKLYN N.Y.
Herbert H. Thompson
his ATTORNEY.

Patented July 21, 1931

1,815,575

UNITED STATES PATENT OFFICE

CHESTER B. MILLS, DECEASED, BY LUELLA H. MILLS, OF BROOKLYN, NEW YORK, AND THE NATIONAL CITY BANK OF NEW YORK, OF NEW YORK, N. Y., COEXECUTORS, ASSIGNORS, BY MESNE ASSIGNMENTS, TO SPERRY GYROSCOPE COMPANY, INC., OF BROOKLYN, NEW YORK, A CORPORATION OF NEW YORK

INDICATING DEVICE

Original application filed September 14, 1921, Serial No. 500,599. Divided and this application filed August 16, 1927. Serial No. 213,428.

This invention relates to transmitting devices adapted to transmit indications of varying degrees of fineness in different ranges of movement of a movable element. For example, in transmitting an indication of the movements of a ship's rudder to a suitable receiving instrument or rudder angle indicator on the bridge of a vessel it is highly desirable to magnify the indications of rudder movement within, say, 5 degrees to each side of the central position, because the small rudder movements within this range are thus normally employed to counteract the normal yawing movements of a vessel. Beyond this range coarser indications may be employed because the rudder movements are large. The invention is shown and described in connection with transmitting indications of the position of a rudder to a rudder angle indicator but it will be readily apparent that the invention has general application wherever indications varying in fineness in different ranges are to be transmitted, preferably to some suitable receiving instrument. This application is a division of copending application now Patent No. 1,659,828, dated February 21, 1928.

Other objects and advantages of this invention will become apparent in the following detailed description thereof.

In the accompanying drawings

Fig. 1 is a front elevation of a rudder angle indicating instrument adapted to receive the transmitted indication.

Fig. 2 is a horizontal sectional view through the casing of the transmitting instrument taken on the line 2—2 of Fig. 3, and parts being shown in elevation.

Fig. 3 is a vertical section through the transmitting instrument taken in a plane at right angles to the plane of Fig. 2 and disclosing additional parts on top of the case.

Fig. 4 is a wiring diagram.

Fig. 5 is a diagrammatic representation of the rudder and transmitter actuated thereby.

In Fig. 1 there is shown a receiving instrument to which my invention is particularly applicable. This instrument is a rudder angle indicator, that is, an instrument for indicating the position of the rudder to port or to starboard. This instrument comprises a casing 1 within which is enclosed a repeater motor 3 shown diagrammatically in Fig. 4. Said motor comprises a plurality of field poles 4 and a movable armature, the position of which depends upon the particular poles energized. The motor shown may be of the type disclosed in the patent of Elmer A. Sperry, Jr., No. 1,605,571, dated November 2, 1926 for repeater motors, the only difference being that said motor is herein shown provided with nine field poles instead of five. The armature of the motor, as would be readily understood, comprises a pair of oppositely extending elements 5 and 6 cooperating with the field poles. With the motor shown, by varying the energization of the field poles in sets of four and five, thirty-six steps per revolution of the motor armature may be obtained as will appear more fully hereinafter. Fixed to the shaft of the armature is a pointer 8 adapted to be read in conjunction with a scale 9. The latter may be formed in two sections each depicted in any suitable manner on a corresponding semi-circular glass plate mounted in casing 1 just beneath the pointer 8. Said semi-circular plates are designated 10 and 11 respectively and may be of different colors so that it may be readily determined whether the rudder is moved to the port or starboard. If, desired, one of said plates may have the word "Port" marked thereon and the other the word "Starboard". When the rudder is in its neutral position the pointer 8 lies over the dividing line between plates 10 and 11 which corresponds with the zero point of scale 9. Each section of said scale is provided with corresponding graduations by which the angular movement of the rudder to either side of its neutral position may be indicated. In the example shown, each section of said scale is graduated to indicate the angular position of the rudder up to 35 degrees, seventeen graduations being provided on each side of zero. As it is desirable to ascertain the position of the rudder with greater accuracy when the rudder is positioned at small angles with respect to its neutral position, the graduations from zero to five degrees are in units of one degree, while the indications from 5 to 35 degrees, where less accuracy is required, are in units of 2½ degrees. Means are provided for causing each step of the repeater motor and pointer 8 to correspond to one degree of turn of the rudder for movement of the latter between zero and five degrees and for causing each step of said motor and pointer to correspond to 2½ degrees of turn of the rudder for movement of the latter between 5 and 35 degrees.

The means for accomplishing the above purpose, which may be otherwise stated as transmitting fine indications of small deviations of the rudder from neutral and transmitting coarse indications of large deviations of the rudder from neutral, is disclosed in Figs. 2 to 4 inclusive and comprises the novel transmitting instrument therein set forth.

Said transmitting instrument comprises a casing 26 in which is mounted a transmitter proper. The latter comprises a rotatable shaft 27 to which is secured a commutating member 28. The latter may consist of a block 28' of insulating material to which are secured diametrically opposite conducting segments 29, 30. Segment 29 may be electrically connected to a metal ring 31 on shaft 27, while segment 30 may be electrically connected to a similar ring 32 on said shaft. Brushes 33 lead in current to said rings, which, as will be understood, are insulated from shaft 27 and from each other. As segments 29 and 30 rotate, they engage different ones of a series of contacts connected to the field poles of the repeater motor. Such contacts may take the form of spring brushes 34, one for each field pole, said brushes being carried by suitable posts 35 and being engageable by segments 29 and 30. The posts 35 form part of a frame for the transmitter proper, said frame including plates 36 and 37 within which shaft 27 is rotatably mounted. Contact plugs extending from plate 37 and electrically connected to brushes 33 and 34 fit removably into sockets 39 provided in an insulating base 40 secured to the floor of casing 26. A terminal block 41 is also shown secured to said floor and provides means for connecting the brushes of the transmitter with conductors leading to the repeater motor in the indicating instrument.

For causing rotation of shaft 27 in response to turning of the rudder various means may be provided. One form of such means is shown in Figs. 2 and 3. A shaft 42 is shown rotatably mounted within the cover 43 of casing 26 and has secured thereto outside of said casing a crank arm 44 which in turn is connected by a link 45 extending to the moving element, in this case, the link 44' fixed to the pivot posts of the rudder R. Hence whenever the rudder or other moving element turns, the shaft 42 also turns through a corresponding angle. For turning transmitter shaft 27 an arm 49 is fixed to shaft 42. As has been previously pointed out, movements of the rudder outside of certain limits adjacent its neutral position need not be indicated so accurately as movements of the rudder within said limits. For this purpose arm 49 carries two gear segments 50, 51 respectively, at different distances from shaft 42. Gear segment 50 is at a greater distance than segment 51 from said shaft and is designed to engage with a gear 52 fixed to transmitter shaft 27, for movements of the rudder within, say, five degrees on either side of its neutral or zero position. As long as segment 50 turns shaft 27, one degree of rotation of the rudder results in movement of the transmitter an amount sufficient to cause the repeater motor to move pointer 8 through one step. Whenever the rudder is moved beyond five degrees on either side of its neutral position, gear segment 50 moves out of mesh with gear 52, and gear segment 51 comes into mesh with a gear 53 on the shaft 27. The latter segment is so designed as to cause movement of the transmitter sufficient to turn pointer 8 through one step in response to turning of the rudder through two and one-half degrees. Hence for movement of the rudder beyond five degrees on either side of its neutral position, two and one-half degrees of turn of the rudder are necessary before pointer 8 is moved from one graduation to the next on scale 9. When the rudder is moved back within five degrees of its neutral position, segment 51 moves out of mesh with gear 53, and segment 50 again engages gear 52. Gear segment 51 is provided with teeth on opposite sides of segment 50, as shown, so that movement of the rudder beyond five degrees from its neutral position on either side of the latter results in the meshing of said segment 51 with gear wheel 53.

The gearwheel 52 is keyed to the hub 54 of gearwheel 53, which latter gearwheel is in turn keyed directly to shaft 27. A passage 55 may be provided in cover 43 for lubricating hub 54, and a grease cup 56 may be employed for furnishing lubricant to said hub through said passage. A similar passage 57 and grease cup 58 may be provided in connection with shaft 42. The plate 36 of the transmitter may be secured to a plate 59 in turn secured to the cover 43. Said transmitter may thus be removed as a unit with cover 43, the plugs 38 being detachable from sockets 39.

In Fig. 4 are shown the electrical connections between the transmitting and indicating instruments. Current from a direct current main 60 is led to one of contact segments 29, 30 through the corresponding brushes 33, while current from the other of said mains is led to the other of said segments. A coil 61 which serves to polarize the armature of the repeater motor is also supplied with current from said mains. The lamp 12 is shown in parallel with coil 61, switch 22 being interposed in the connections to said lamp. Each of brushes 34 is connected to a corresponding one of the coils 63 of field poles 4. The segments 29, 30 are designed so that as the transmitter shaft is turned the field coils 63 are energized consecutively in alternate groups of four and five. For example, the segments 29 and 30 are shown in Fig. 4 in such position that field windings 63$^a$, 63$^b$, 63$^e$ and 63$^f$, are energized. Now if the commutator 28 be turned clockwise the brush 34 that corresponds with coil 63$^i$ will be engaged by segment 30 and thereupon the last mentioned coil is energized in addition to the aforementioned coils so that the repeater motor armature is turned through ten degrees clockwise from its position shown. Clockwise rotation of commutator 28 through another 10 degrees results in the breaking of contact between segment 30 and the brush connected to coil 63$^b$, the brushes connected with coils 63$^e$ and 63$^f$ still remaining in contact with segment 29 and the brushes connected to coils 63$^a$ and 63$^e$ remaining in contact with segment 30 so that an additional ten degrees clockwise rotation of the repeater armature results. Thus the coils of the repeater motor are energized in such sequence as to cause movement of the armature through ten degrees for each ten degrees of rotation of the commutator 28. For one revolution of said commutator the armature of the repeater motor, and hence pointer 8, is turned through 36 steps, each of ten degrees. As has been heretofore explained, the connections between the rudder and the shaft 27 of commutator 28 are such that for movements of the rudder within five degrees of its neutral position turning of the rudder through one degree results in turning of commutator 28 sufficiently to move the armature of the repeater motor through one step, while for movements of the rudder beyond five degrees of its neutral position movement of said armature through one step corresponds to turning of the rudder through two and one-half degrees. It will thus be seen that as the rudder turns, its angular position will be indicated by pointer 8 on scale 9.

The type of motor shown in Fig. 4 is self-synchronous and is particularly advantageous for this reason. If the current supply should fail and the rudder be turned while the current is off, the reestablishment of current in the system results in the automatic setting of the armature of the repeater motor in synchronism with the rudder and hence pointer 8 automatically assumes a position which shows the correct position of the rudder.

In accordance with the provisions of the patent statutes, I have herein described the principle of operation of my invention, together with the apparatus, which I now consider to represent the best embodiment thereof, but I desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having described my invention, what I claim and desire to secure by Letters Patent is:

1. In an indicating system for indicating at a distance the movements of a member, the combination with said member, of an indicator, a transmitter, means whereby said transmitter actuates said indicator, and means whereby said member actuates said transmitter, said last-named means including a connection whereby said transmitter is operated through unequal increments of angular movement corresponding to equal increments of movement of said member in various stages of the movement of said member.

2. In an indicating system for indicating at a distance the movements of a member, the combination with said member, of an indicator, a transmitter, means whereby said transmitter actuates said indication, and means whereby said member actuates said transmitter, said last-named means including a fine connection and a coarse connection whereby said transmitter is operated through unequal increments of angular movement corresponding to equal increments of movement of said member in various stages of the movement of said member.

3. In an indicating system for indicating at a distance the movements of a member, the combination with said member, of an indicator, a transmitter, means whereby said transmitter actuates said indicator, and means whereby said member actuates said transmitter, said last-named means including a fine connection and a coarse connection whereby said transmitter is operated through unequal increments of angular movement corresponding to equal increments of movement of said member and means whereby said connections become successfully effective in the continued movement of said member.

4. In an indicating system for indicating at a distance the movements of a member, the combination with said member, of an indicator, a transmitter, means whereby said transmitter actuates said indicator, and means whereby said member actuates said transmitter, said last-named means including a fine gearing connection, a coarse gearing connection, and means whereby said connections are successively rendered effective whereby said transmitter is operated with different degrees of fineness in various stages of the movement of said member.

5. In an indicating system for indicating at a distance the movements of a member, the combination with said member, of an indicator, a transmitter, means whereby said transmitter actuates said indicator, and means whereby said member actuates said transmitter, said last-named means including a fine gearing connection and a coarse gearing connection, and said connections being arranged to become successively effective in the continued movement of said member.

6. In an indicating system for indicating at a distance the movements of a member, the combination with said member, of an indicator, a transmitter, means whereby said transmitter actuates said indicator, and means whereby said member actuates said transmitter, said last-named means including a plurality of concentric gears of various sizes, means whereby said member moves said gear, a gear segment connected to said transmitter and subdivided into successive portions, each portion adapted to mesh successively with one of said concentric gears whereby said transmitter is operated with different degrees of fineness in various stages of the movement of said member.

7. In an indicating system for indicating at a distance the movements of a member, the combination with said member, of an indicator, a transmitter, means whereby said transmitter actuates said indicator, and means whereby said member actuates said transmitter, said last-named means including a fine connection and a coarse connection, said connections being arranged so that said fine connection is effective in the early stages of the movement of said member within predetermined limits and said coarse connection is effective during the movements of said member beyond said limits.

8. In a rudder angle indicating system, in combination, a rudder, an indicator, a transmitter, means whereby said transmitter actuates said indicator, and means whereby said rudder actuates said transmitter, said last-named means including a connection between said rudder and transmitter such that said transmitter is operated through unequal increments of angular movement corresponding to equal increments of movement of said member in various stages of the movement of said rudder.

9. In a rudder angle indicating system, in combination, a rudder, an indicator, a transmitter, means whereby said transmitter actuates said indicator, and means whereby said rudder actuates said transmitter, said last-named means including a fine connection and a coarse connection whereby said transmitter is operated through unequal increments of angular movement corresponding to equal increments of movement of said member, and means whereby said connections become successively effective in the continued movements of said rudder.

10. In a rudder angle indicating system, in combination, a rudder, an indicator, a transmitter, means whereby said transmitter actuates said indicator, and means whereby said rudder actuates said transmitter, said last-named means including a fine connection and a coarse connection whereby said transmitter is operated through unequal increments of angular movement corresponding to equal increments of movement of said member, means whereby said connections become successively effective, and means whereby said fine connection is effective within predetermined limits of movement of said rudder, and said coarse connection during movements of said rudder beyond said limits.

In testimony whereof we have affixed our signatures.

LUELLA H. MILLS,
NATIONAL CITY BANK
OF NEW YORK,
By J. FRANK BIRDSELL,
*Trust Officer*,
*Coexecutors of Chester B. Mills, deceased.*